United States Patent
Mantere, III et al.

(10) Patent No.: US 9,811,381 B2
(45) Date of Patent: *Nov. 7, 2017

(54) RESOURCE RESTRICTION SYSTEMS AND METHODS

(71) Applicant: Apple Inc., Cupertino, CA (US)

(72) Inventors: Jussi-Pekka Mantere, III, Mountain View, CA (US); Alexander Tony Maluta, Evergreen, CO (US); John William Scalo, Santa Cruz, CA (US); Eugene Ray Tyacke, Castle Rock, CO (US); Bruce Gaya, Palo Alto, CA (US); Michael John Smith, Sunnyvale, CA (US); Peter Kiehtreiber, Campbell, CA (US); Simon P. Cooper, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,052

(22) Filed: Jul. 25, 2016

(65) Prior Publication Data
US 2017/0083370 A1    Mar. 23, 2017

Related U.S. Application Data

(63) Continuation of application No. 14/491,970, filed on Sep. 19, 2014, now Pat. No. 9,400,688, which is a
(Continued)

(51) Int. Cl.
*H04L 29/00* (2006.01)
*G06F 9/50* (2006.01)
(Continued)

(52) U.S. Cl.
CPC .............. *G06F 9/5005* (2013.01); *G06F 9/54* (2013.01); *G06F 21/44* (2013.01); *G06F 21/602* (2013.01); *H04L 63/104* (2013.01)

(58) Field of Classification Search
CPC .............. G03G 15/00; G06F 3/00; G06F 9/44
(Continued)

(56) References Cited

U.S. PATENT DOCUMENTS 6,505,300 B2  1/2003  Chan et al.
6,898,711 B1  5/2005  Bauman et al.
(Continued)

OTHER PUBLICATIONS

Chris Wright, Crispin Cowan, Stephen Smalley, James Morris, Greg Kroah-Hartman / Linux Security Modules: General Security Support for the Linux Kernel/ 2002/ Cite Seer / pp. 1-15.*
(Continued)

*Primary Examiner* — Brandon Hoffman
*Assistant Examiner* — Michael D Anderson
(74) *Attorney, Agent, or Firm* — Adeli LLP

(57) ABSTRACT

Resource restrictions are associated with a user identifier. A resource restriction agent receives operating system calls related for resources and provides resource request data to a resource agent. The resource agent determines whether the resource is restricted based on the resource request data and resource restriction data and generates access data based on the determination. The resource restriction agent grants or denies the system call based on the access data.

20 Claims, 4 Drawing Sheets

Related U.S. Application Data continuation of application No. 13/729,014, filed on Dec. 27, 2012, now Pat. No. 8,874,905, which is a continuation of application No. 11/462,600, filed on Aug. 4, 2006, now Pat. No. 8,352,733.

(51) Int. Cl.
| | |
|---|---|
| *H04L 29/06* | (2006.01) |
| *G06F 21/60* | (2013.01) |
| *G06F 9/54* | (2006.01) |
| *G06F 21/44* | (2013.01) |

(58) Field of Classification Search
USPC .......................................................... 713/164
See application file for complete search history.

(56) References Cited

U.S. PATENT DOCUMENTS

| | | | |
|---|---|---|---|
| 7,296,274 B2* | 11/2007 | Cohen | G06F 21/55 713/182 |
| 7,406,530 B2 | 7/2008 | Brown et al. | |
| 8,064,789 B2* | 11/2011 | Moroi | G06F 21/629 358/1.15 |
| 8,352,733 B2 | 1/2013 | Mantere et al. | |
| 8,874,905 B2 | 10/2014 | Mantere, III et al. | |
| 9,400,688 B2 | 7/2016 | Mantere, III et al. | |
| 2004/0194104 A1 | 9/2004 | Beresnevichiene et al. | |
| 2004/0205176 A1 | 10/2004 | Ting et al. | |
| 2005/0075115 A1 | 4/2005 | Corneille et al. | |
| 2005/0149726 A1 | 7/2005 | Joshi et al. | |
| 2005/0210270 A1 | 9/2005 | Rohatgi et al. | |
| 2006/0160523 A1 | 7/2006 | Erskine et al. | |
| 2006/0174326 A1 | 8/2006 | Ginter et al. | |
| 2006/0208829 A1 | 9/2006 | Earhart et al. | |

OTHER PUBLICATIONS

Author Unknown, "Windows XP Security Guide. Chapter 6: Software Restriction Policy for Windows XP Clients," Apr. 13, 2006, 19 pages, Microsoft TechNet, available at http://www.microsoft.com/technet/security/prodtech/windowsxp/secwinxp/xpsgch06.mspx.

Posey, Brien M., "Using Software Restriction Policies to Keep Games Off of Your Network," Aug. 25, 2004, 7 pages, WindowsNetworking.com, available at http://www.windowsnetworking.com/articles_tutorials/Software-Restriction-Policies.html.

Smith, Jesse, "Setting Up a Software Restriction and Wireless Network Policy with Windows 2003 Group Policy," Aug. 6, 2004, 5 pages, Sams Informit Network, available at http://www.samspublishing.com/articles/article.asp?p=327395&seqNum=2&rl=1.

* cited by examiner

RESOURCE RESTRICTION SYSTEMS AND METHODS

CLAIM OF BENEFIT TO PRIOR APPLICATIONS

This Application is a continuation application of U.S. patent application Ser. No. 14/491,970, filed Sep. 19, 2014, now published as U.S. Patent Publication 2015/0020077. U.S. patent application Ser. No. 14/491,970 is a continuation of U.S. patent application Ser. No. 13/729,014, filed Dec. 27, 2012, now issued as U.S. Pat. No. 8,874,905. U.S. patent application Ser. No. 13/729,014 is a continuation of U.S. patent application Ser. No. 11/462,600, filed Aug. 4, 2006, now issued as U.S. Pat. No. 8,352,733. U.S. Patent Publication 2015/0020077 and U.S. Pat. Nos. 8,874,905 and 8,352,733 are incorporated herein by reference.

BACKGROUND

This disclosure relates to enforcing resource restrictions in an environment.

Users may often have associated resource restrictions on a computer device, such as a personal computer or other computing device. Typically these resource restrictions are associated with a user identifier. For example, a parent may limit the availability of applications, such as an e-mail client and web browser, on a home computer for a child by associating resource restrictions with the child's user identifier. When the child logs onto the computer with his or her user identifier, the web browser and e-mail client is not available. Likewise, a workgroup administrator may limit the availability of resources on a business computer for certain employees. For example, a software development company may limit file sharing and/or access to particular development tools for employees according to the employees' user profiles.

Restrictions may be circumvented if the restriction is predicated on preventing the generation of a system call for the resource. Thus if a user determines how to generate the system call for a restricted resource, the user can have access to the resource. For example, a browser application can be restricted for a user by a restriction program that inhibits the generation of menu items, desktop icons and dock icons for launching the browser application. However, if the user clicks on a web address in an HTML enabled document in a word processing program, the word processing program can generate a system call to launch the browser application, thus circumventing the restriction.

SUMMARY

Disclosed herein are systems and methods for enforcing resource restrictions.

In one implementation, an execution call to an operating system for an application launch is received above a user level, and a determination is likewise made above a user level as to whether launch restrictions for a user restrict the application launch. The execution call is cancelled if the launch restrictions for the user restrict the application launch.

In another implementation, a system includes a data store, a resource restriction service, and a resource agent. The data store stores data that associates resource restrictions with a user identifier. The resource restriction service is configured to receive system calls related to resources and directed to an operating system, determine resource request data associated with the system call, and provide the resource request data to a resource agent. The resource agent is configured to access the data store and determine whether the resource is restricted based on the resource request data provided by the resource restriction agent and generate access data based on the determination. The access data are provided to the resource restriction service, which in turn grants or denies the system call based on the access data.

These and the additional implementations described below facilitate enforcement of resource restrictions on a computer system.

DETAILED DESCRIPTION

Figure 1:
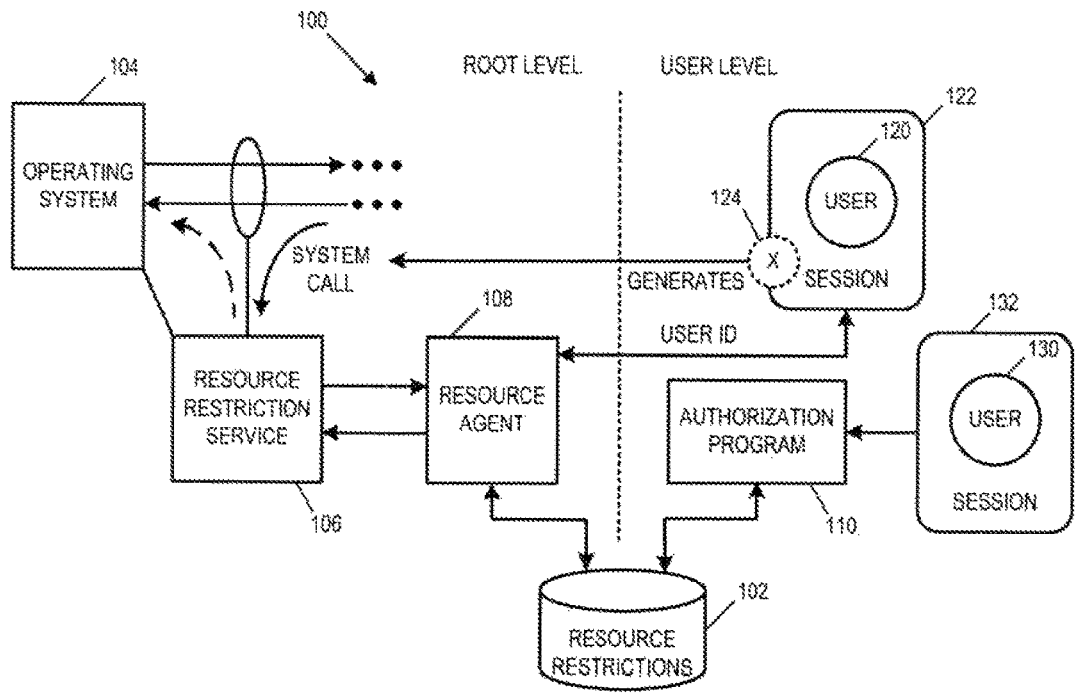
FIG. 1 is a block diagram of a system for enforcing resource restrictions.

FIG. 1 is a block diagram of a system 100 for enforcing resource restrictions. The system 100 can be implemented in a computer or in a computer network. A data store 102 stores data defining resource restrictions for one or more users. In one implementation, the resource restrictions are associated with users by user identifiers, such as user login names, user profiles, or other user identifiers. The resource restrictions may relate to particular resources, such as an application launch, listening to a socket connection, file sharing, or some other resource initiated by a system call.

An operating system 104 includes a resource restriction service 106. The resource restriction service 106 may comprise code that provides a system-level service for receiving system calls and processing the system call to determine whether the corresponding resources are restricted. In one implementation, the resource restriction service 106 may comprise code that loads during a system startup, such as a system extension or boot program. In another implementation, the resource restriction service 106 may comprise code that loads only as required, such as a library that is linked to a profile of a user having associated restrictions, and which is executed only when that user is logged onto the computer.

The resource restriction service 106 is configured to receive system calls and determine the user identifier of a user 120 associated with the system call. In one implementation, the user identifier is determined according to the current user session 122. Thus, the system call for a resource is associated with the user 120 by the user session 122 regardless of whether the user 120 requests the resource or if a separate process 124 requests the resource. An example separate process 124 may include a program that requests a restricted resource, e.g., a word processing program that includes an HTML link for a restricted browser, or an agent or process launched either intentionally or inadvertently by the user 120.

In one implementation, the resource restriction service 106 is cooperatively associated with a resource agent 108 that determines whether to grant or deny the system call. Alternatively, both these functions can be implemented in the resource restriction service 106. The resource restriction service 106 provides resource request data, such as the user identifier and/or a system call identifier, to the resource agent 108. The resource agent 108 is configured to access the data store 102 and determine whether the requested resource is restricted for the user 120 based on the resource request data. In one implementation, the resource agent 108 is configured to determine one or both of the user identifier and system call identifier as necessary to make the restriction determination. For example, if the resource request data includes only a user identifier, then the resource agent 108 can be configured to determine a system call identifier. Likewise, if the resource request data includes only a system call identifier, then the resource agent 108 can be configured to determine the user identifier. In another implementation, the resource request data may only indicate that a system call has been received, and the resource agent 108 can be configured to determine both the user identifier and the system call identifier.

The resource agent 108 can be instantiated on a per-user basis. In another implementation, the resource agent 108 can be a background process that operates independent of any user.

The resource agent 108 generates access data (e.g., a value) based on the determination and provides the access data to the resource restriction service 106, which, in turn, grants or denies the system call accordingly. In one implementation, the access data may be a logical value, e.g., a logic 0 to deny the system call and a logic 1 to grant the system call.

Communication between the resource restriction service 106 and the resource agent 108 may be through a privileged socket, such as a root-owned socket. For example, upon loading the resource restriction service 106, the resource restriction service 106 may register a root-owned socket. The privileged socket ensures that user-level processes cannot be inserted into the authorization process.

In one implementation, the resource agent 108 informs the resource restriction service 106 that system calls should be monitored for specific user identifiers. The user identifiers are registered with the resource restriction service 106, and thereafter any system calls for the registered user identifiers cause the resource restriction service 106 to send a request for access data to the resource agent 108.

In another implementation, the resource restriction service 106 comprises a launch restriction extension and the resource agent 108 comprises a user agent. The launch restriction extension is configured to intercept execution calls to a kernel for an application launch and determine resource request data associated with the execution call, and to provide the resource request data to a user agent. The user agent is configured to determine whether an application launch is restricted based on the resource request data provided by the launch restriction agent and generate the launch data based on the determination. The launch restriction extension, in turn, grants or denies the execution call based on the launch data.

In another implementation, the resource agent 108 and the resource restriction service 106 are privileged processes. For example, the resource agent 108 and the resource restriction service 106 can be root-owned processes to limit user access.

An authorization program 110 is configured to define resource restrictions for users and store the defined resource restrictions in the data store 102. The authorization program 110 may be associated with a particular user 130, such as a parent or a workgroup administrator, so that it may only be executed during the user session 130, or may be password protected by a password known only by the use 130. The authorization program 110 can thus operate at the user level.

Figure 2:
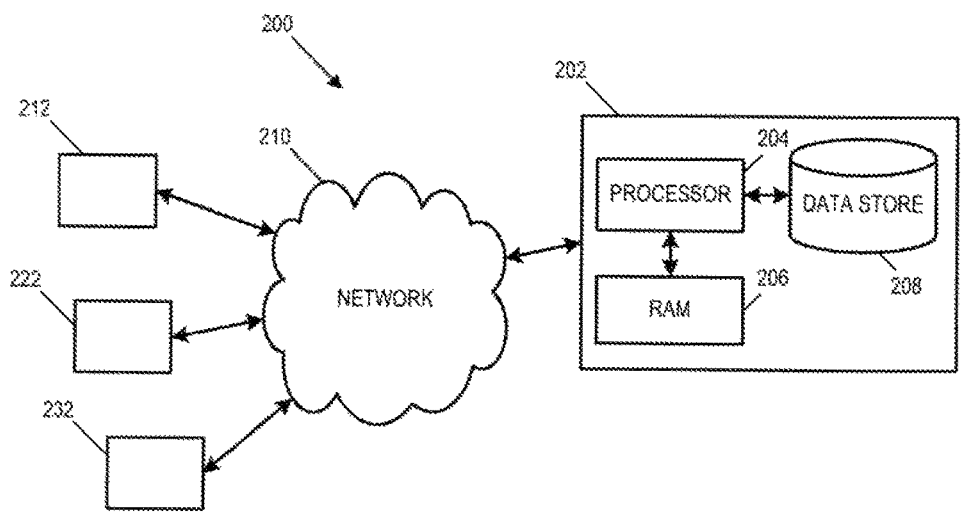
FIG. 2 is a block diagram of an example network environment in which the system of FIG. 1 can be implemented.

FIG. 2 is a block diagram of an example network environment 200 in which the system of FIG. 1 can be implemented. The network environment 200 includes a computer 202 having a processor 204, a random access memory 206, and a data store 208.

In one implementation, the computer 202 can be a client computer, such as a computer connected to a network in a home or an office. The system 100 of FIG. 1 can be implemented on the computer 202 and enforces resource restrictions on the computer 202. For example, if the network 210 is the Internet, the system 100 can preclude access to e-mail client software and web browsers for particular users of the computer 202.

In one implementation, the computer 202 can be a server computer, such as a server connected to a local area network. A system wide process, such as a network daemon, can be used to implement a resource agent 108 and communicate with resource restriction services 106 on devices 212, 222, and 232. The devices 212, 222, and 232 may include client computers or other computer devices, such as personal digital assistants, wireless communication devices, or other devices that can have associated user restrictions. The system of FIG. 1 can also be implemented in the network environment by other schemes, such as instantiating a resource agent 108 on each client computer 212, 222, and 232, and centrally locating the user restrictions in the data store 208.

Figure 3:
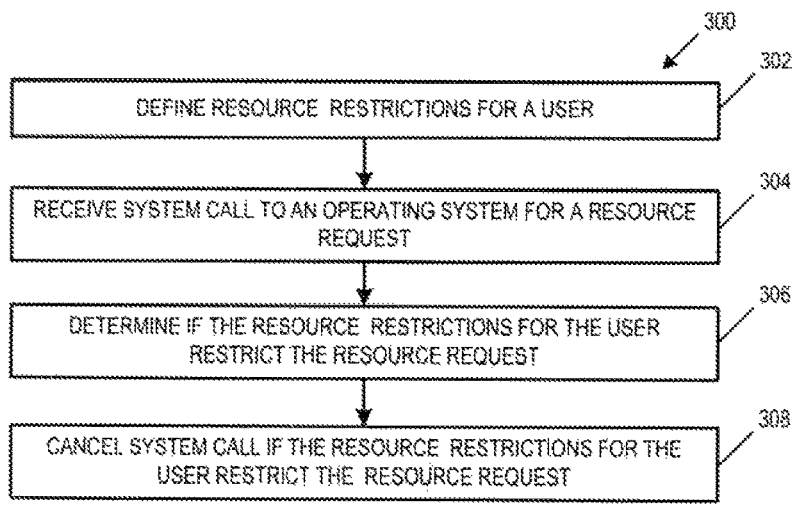
FIG. 3 is a flow diagram of an example process for enforcing resource restrictions.

FIG. 3 is a flow diagram of an example process 300 for enforcing resource restrictions. Stage 302 defines resource restrictions for a user. In one implementation, resource restrictions can be associated with a user identifier.

Stage 304 receives a system call to an operating system for a resource request. In one implementation, the resource restrictions can be application launch restrictions, and the system calls can be execution calls for an application launch.

Stage 306 determines if the resource restrictions for the user restrict the resource request. This determination is based on the resource restrictions defined in stage 302.

Stage 308 cancels the system call if the resource restrictions for the user restrict the resource request.

Figure 4:
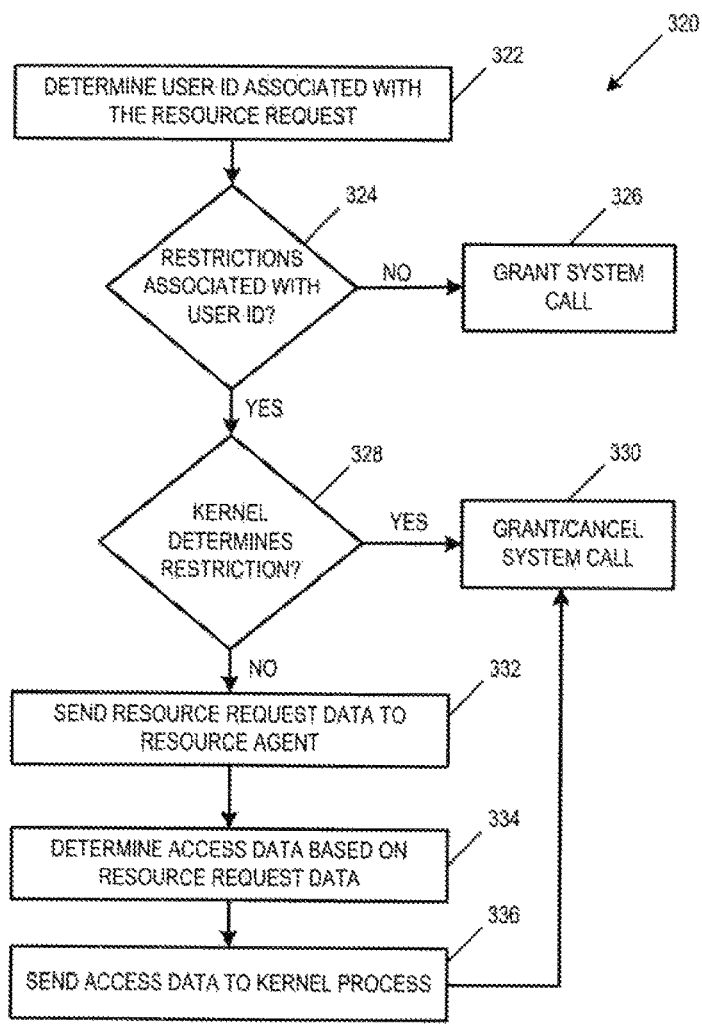
FIG. 4 is a flow diagram of an example kernel selection process for enforcing resource restrictions.

FIG. 4 is a flow diagram of an example kernel selection process 320 for enforcing resource restrictions. The kernel selection process 320 is implemented in response to a resource request. Stage 322 determines a user identifier associated with the resource request. The user identifier can be determined, for example, based on the current user session of a user logged onto a computer.

Stage 324 determines if there are restrictions associated with the user identifier. If there are no restrictions associated with the user identifier, then stage 326 grants the system call.

If there are restrictions associated with the user identifier, however, then stage 328 determines if a kernel process is to determine if the system call is for a resource that is restricted for the user. An example of such a kernel process is a process to determine a restriction based on a bundle identifier of a software program, and which can be implemented in the resource restriction service 106. If a kernel process is to make such a determination, then stage 330 grants or cancels the system call based on the kernel determination.

If however, a kernel process is not to make such a determination, then stage 332 sends the resource request data to a resource agent (e.g., the resource agent 108). The resource agent may implement added functionality not readily available in the kernel or through an extension, such determining a hash, for example.

Stage 334 determines the access data based on the resource request data. For example, the resource agent 108 can access the resource restrictions stored in the data store 102 and generate access data, such as a 1 or a 0, based on the resource request data.

Stage 336 sends the access data (e.g., a data value) to the kernel process, and thereafter stage 330 grants or cancels the system call accordingly.

Figure 5:
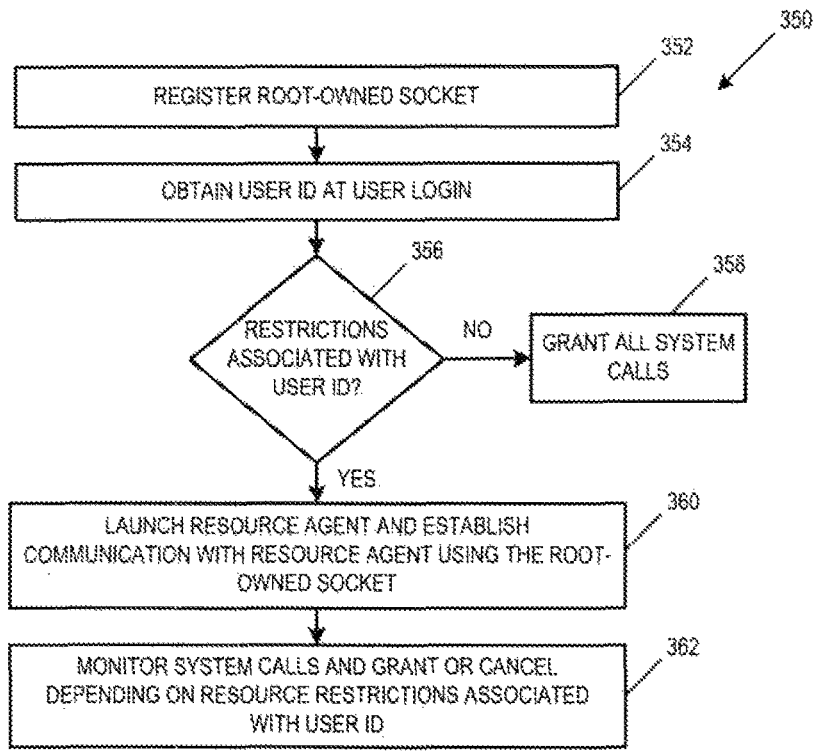
FIG. 5 is a flow diagram of an example process for enforcing resource restrictions with a user-specific agent.

FIG. 5 is a flow diagram of an example process 350 for enforcing resource restrictions with a user-specific agent. In this implementation, an agent is instantiated for each user. Stage 352 registers a root-owned socket for communicating with a kernel process, such as a socket for the resource restriction service 106.

Stage 354 obtains or determines a user identifier at the user's login, and stage 356 determines if restrictions are associated with the user identifier. If restrictions are not associated with the user identifier, then stage 358 grants all system calls.

If, however, restrictions are associated with the user identifier, then stage 360 launches a resource agent (e.g., the resource agent 108) and establishes communication with the kernel process using the root-owned socket. Thereafter, system calls are monitored in stage 362 and granted or canceled by the kernel process and resource agent depending on the resource restrictions associated with the user identifier.

Figure 6:
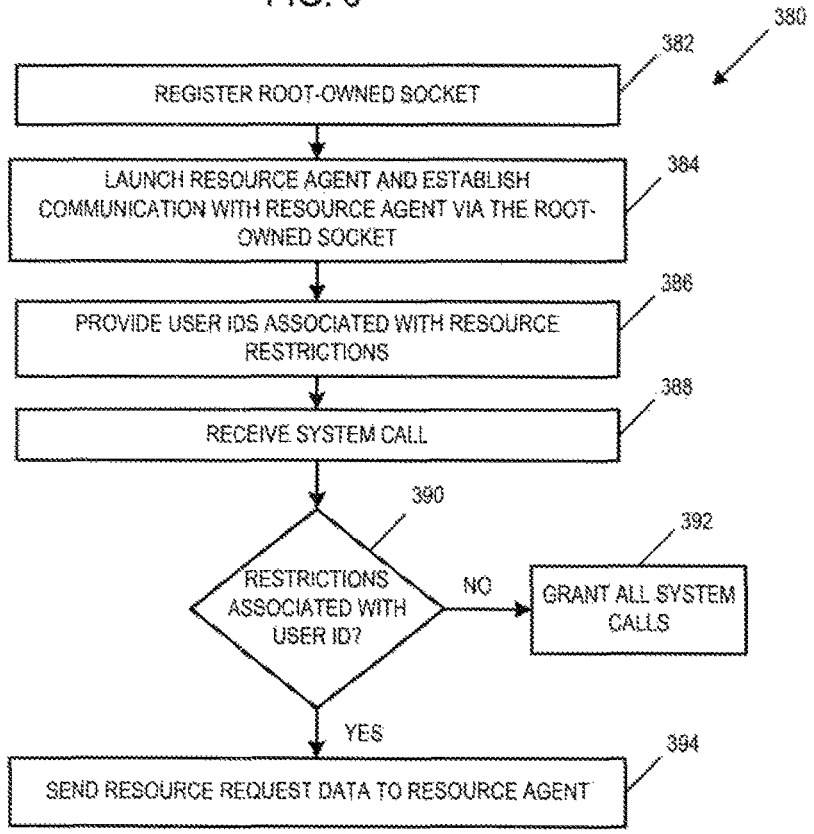
FIG. 6 is a flow diagram of an example process for enforcing resource restrictions with a user-independent agent.

FIG. 6 is a flow diagram of an example process 380 for enforcing resource restrictions with a user-independent agent. In this implementation, one agent is instantiated for all users.

Stage 382 registers a root-owned socket for communicating with a kernel process, such as a socket for the resource restriction service 106.

Stage 384 launches a resource agent (e.g., the resource agent 108) and establishes communication between the resource agent and a kernel process using the root-owned socket. The resource agent may be launched during a boot process or in response to a first user login.

Stage 386 provides the user identifiers having associated resource restrictions to the kernel process. Thereafter, stage 388 receives a system call, and stage 390 determines if restrictions are associated with the user identifier for the system call. If restrictions are not associated with the user identifier, then stage 392 grants the system call.

If, however, restrictions are associated with the user identifier, stage 394 provides resource request data to the resource agent 108. Process stages similar to stages 334 and 336 of FIG. 4 are thereafter implemented to grant or deny the system call.

Figure 7:
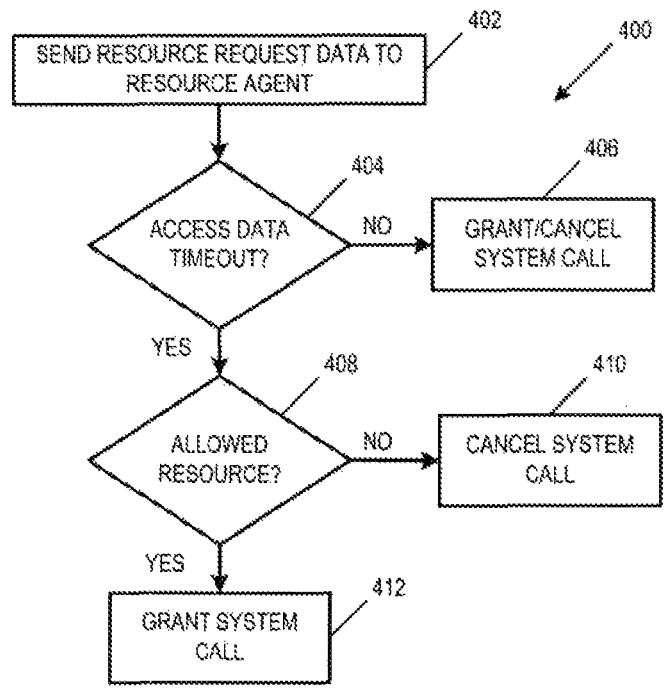
FIG. 7 is a flow diagram of an example time-out process for enforcing resource restrictions.

FIG. 7 is a flow diagram of an example time-out process 400 for enforcing resource restrictions. The time-out process 400 is an error process that facilitates the processing of allowed system calls in the event that communication between the operating system process and the resource agent (e.g., the resource agent 108) is terminated or in the event that the resource agent crashes or is terminated by a user attempting to circumvent the resource restrictions.

Stage 402 sends the resource request data to the resource agent. Thereafter, stage 404 determines if access data are received from the resource agent before a time-out period. If the access data are received from the resource agent before a time-out period, then stage 406 grants or cancels the system call according to resource restrictions associated with the user.

If the access data are not received from the resource agent before a time-out period, however, then stage 408 determines if the requested resource is an allowed resource. Allowed resource can include resources pre-selected by another user, such as a parent or a workgroup manager. Alternatively, allowed resources can include resources associated with particular system functions.

If the resource is not an allowed resource, then the system call is cancelled in stage 410; otherwise, the system call is granted in stage 412.

Figure 8:
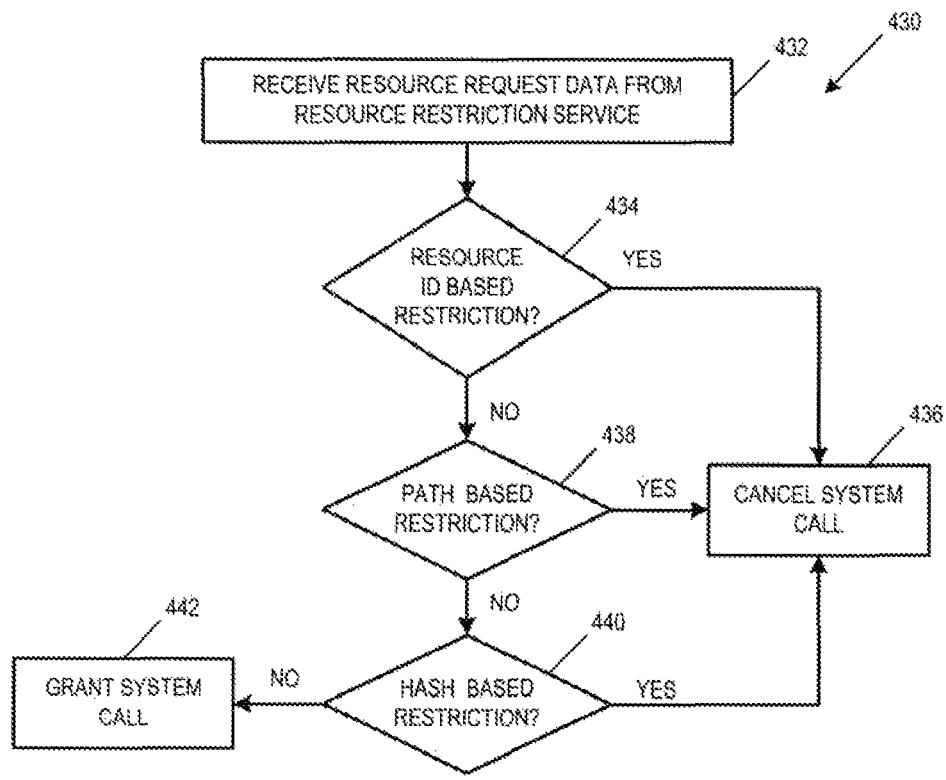
FIG. 8 is a flow diagram of an example process for enforcing resource restrictions.

FIG. 8 is a flow diagram of an example process 430 for enforcing resource restrictions. The example process 430 can be implemented in a resource agent (e.g., the resource agent 108). The restrictions can be identifier-based, path-based, or hash-based, or based on some other identification scheme. Identifier-based restrictions limit access to a resource based on a resource identifier, such as a non-unique or unique number. Path-based restrictions limit access to a resource based on a path. Hash-based restrictions limit access to a resource based on a hash of a file associated with the resource.

Stage 432 receives the resource request data from a resource restriction service (e.g., the resource restriction service 106). Stage 434 determines if the resource is subject to a resource identifier-based restriction. If so, the system call is cancelled in stage 436.

If the resource is not subject to a resource identifier-based restriction, then stage 438 determines if the resource is subject to a path-based restriction. If so, the system call is cancelled in stage 436.

If the resource is not subject to a path-based restriction, then stage 440 determines if the resource is subject to a hash-based restriction. If so, the system call is cancelled in stage 436; otherwise, the system call is granted in stage 442.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method comprising:
   receiving an execution call to an operating system for launching an application, the execution call associated with resource request data that identifies a user;

intercepting the execution call using an operating system kernel service;

from the operating system kernel service, providing the resource request data to a resource agent;

receiving launch data from the resource agent in response; and granting or denying the execution call based on the launch data, wherein the resource agent is configured to execute in a user space outside the operating system kernel and perform operations comprising:

determining whether the launching of the application is restricted for the user based at least in part on the resource request data provided by the operating system kernel service; and generating the launch data based on the determination.

2. The method of claim 1, wherein the operating system kernel service is configured to communicate with the resource agent via a kernel control socket.

3. The method of claim 2, wherein the kernel control socket is a root-owned socket.

4. The method of claim 1 further comprising:

determining if the launch data is received before expiration of a time period; and if the launch data is not received before the expiration of the time period, only granting the execution call if the application is an allowed application.

5. The method of claim 4, wherein an allowed application is defined by an application path.

6. The method of claim 1, wherein the resource agent determines whether the launching of the application is restricted further based on one or more launch restrictions.

7. The method of claim 6, wherein the launch restrictions are defined by at least one of an application path and an application hash.

8. The method of claim 1, wherein the resource agent includes a user agent that is specific to the user.

9. The method of claim 1, wherein the resource request data comprises data identifying the execution call.

10. The method of claim 1, wherein the operating system kernel service includes a launch restriction extension of an operating system kernel.

11. A non-transitory machine readable medium storing an operating system kernel service for execution by at least one processing unit, the operating system kernel service comprising sets of instructions for:

receiving an execution call to an operating system for launching an application, the execution call associated with resource request data that identifies a user;

intercepting the execution call;

providing the resource request data to a resource agent;

receiving launch data from the resource agent in response; and granting or denying the execution call based on the launch data, wherein the resource agent is configured to execute in a user space outside the operating system kernel and perform operations comprising:

determining whether the launching of the application is restricted for the user based at least in part on the resource request data provided by the operating system kernel service; and generating the launch data based on the determination.

12. The non-transitory machine readable medium of claim 11, wherein the operating system kernel service communicates with the resource agent via a kernel control socket.

13. The non-transitory machine readable medium of claim 11, wherein the operating system kernel service further comprises sets of instructions for:

determining if the launch data is received before expiration of a time period; and if the launch data is not received before the expiration of the time period, only granting the execution call if the application is an allowed application.

14. The non-transitory machine readable medium of claim 13, wherein an allowed application is defined by an application path.

15. The non-transitory machine readable medium of claim 11, wherein the resource agent includes a user agent that is specific to the user.

16. An electronic device comprising:

a set of processing units for executing sets of instructions; and a non-transitory machine readable medium storing an operating system kernel service for execution by at least one of the processing units, the operating system kernel service comprising sets of instructions for:

receiving an execution call to an operating system for launching an application, the execution call associated with resource request data that identifies a user;

intercepting the execution call;

providing the resource request data to a resource agent;

receiving launch data from the resource agent in response; and granting or denying the execution call based on the launch data, wherein the resource agent is configured to execute in a user space outside the operating system kernel and perform operations comprising:

determining whether the launching of the application is restricted for the user based at least in part on the resource request data provided by the operating system kernel service; and generating the launch data based on the determination.

17. The electronic device of claim 16, wherein the resource agent determines whether the launching of the application is restricted further based on one or more launch restrictions.

18. The electronic device of claim 17, wherein the launch restrictions are defined by at least one of an application path and an application hash.

19. The electronic device of claim 16, wherein the resource request data comprises data identifying the execution call.

20. The electronic device of claim 16, wherein the operating system kernel service includes a launch restriction extension of an operating system kernel.

* * * * *